United States Patent
Guo

(10) Patent No.: US 11,815,170 B2
(45) Date of Patent: Nov. 14, 2023

(54) DIFFERENTIAL LOCKING MECHANISM

(71) Applicant: Fang Guo, Jining (CN)

(72) Inventor: Fang Guo, Jining (CN)

(*) Notice: Subject to any disclaimer, the term of this patent is extended or adjusted under 35 U.S.C. 154(b) by 65 days.

(21) Appl. No.: 17/531,661

(22) Filed: Nov. 19, 2021

(65) Prior Publication Data
US 2022/0082161 A1 Mar. 17, 2022

Related U.S. Application Data

(63) Continuation of application No. PCT/CN2020/091616, filed on May 21, 2020.

(51) Int. Cl.
*F16H 48/24* (2006.01)
*F16H 48/10* (2012.01)
*F16H 48/11* (2012.01)

(52) U.S. Cl.
CPC ............. *F16H 48/24* (2013.01); *F16H 48/10* (2013.01); *F16H 48/11* (2013.01)

(58) Field of Classification Search
CPC .......... F16H 48/10–11; F16H 48/20–2048/346
See application file for complete search history.

(56) References Cited

U.S. PATENT DOCUMENTS

| | | | | |
|---|---|---|---|---|
| 677,771 A * | 7/1901 | Birdsall | ............... | F16H 48/10 475/252 |
| 1,668,352 A * | 5/1928 | Brackenbury | .......... | F16H 48/11 475/30 |
| 1,691,230 A * | 11/1928 | Dennison | ............... | F16H 48/30 475/250 |
| 5,176,590 A * | 1/1993 | Haydock | ............... | F16H 48/24 475/249 |
| 5,749,803 A * | 5/1998 | Teraoka | ............... | F16H 48/10 475/249 |
| 11,204,086 B2 * | 12/2021 | Guo | ............... | F16H 48/22 |
| 2009/0062055 A1 | 3/2009 | Alfredson | | |

FOREIGN PATENT DOCUMENTS

| | | |
|---|---|---|
| CN | 109812561 A | 5/2009 |
| CN | 109027177 A | 12/2018 |
| CN | 109707819 A | 5/2019 |
| CN | 110206865 A | 9/2019 |
| EP | 1860344 A1 | 11/2007 |
| GB | 1093350 A | 11/1967 |
| GB | 2462363 A | 2/2010 |

* cited by examiner

*Primary Examiner* — Ernesto A Suarez
*Assistant Examiner* — James J Taylor, II

(57) ABSTRACT

A differential locking mechanism including a differential mechanism and a locking mechanism. The differential mechanism includes a driven gear, a shell, two half shafts, two half-shaft gears and a planetary gear set, planetary gear shafts. The locking mechanism includes a sleeve, a third gear, a toothed sleeve, a shifting fork and a fixing piece. An end of the first planetary gear shaft, facing outside of the shell, is fixedly provided with the third gear. An end of the shell is fixedly provided with the sleeve; a side of the sleeve close to the shell is sleeved with a fourth gear rotationally connected with the sleeve; one end of the fourth gear is fixedly provided with a fifth gear rotationally connected with the sleeve; a side of the sleeve away from the shell is provided with a longitudinal tooth groove; the toothed sleeve is sleeved on the sleeve.

4 Claims, 2 Drawing Sheets

DIFFERENTIAL LOCKING MECHANISM

CROSS-REFERENCE TO RELATED APPLICATIONS

This application is a continuation of International Patent Application No. PCT/CN2020/091616 with a filing date of May 21, 2020, designating the United States, and further claims priority to Chinese Patent Application No. 201910459373.8 with a filing date of May 29, 2019. The content of the aforementioned applications, including any intervening amendments thereto, are incorporated herein by reference.

TECHNICAL FIELD

The present disclosure relates to the field of automobile accessories, in particular to a differential locking mechanism.

BACKGROUND ART

At present, the current existing differential locking mechanism has disadvantages of complex structure, high requirements on materials, and difficult to manufacture with expensive. Some have a complicated locking process that can be locked only by stopping or slowing the vehicles. Some have a slow reaction speed, or low structural strength without durability and are difficult to repair.

In view of the aforementioned disadvantages, the present disclosure relates to a differential locking mechanism which is relatively simple in structure and durable, having low requirements for technology and material, and easy to fabricate and assembly, further having easy locking operation and sensitive reaction, and without stopping or reducing the speed of the vehicle the locking operation may be realized. Additionally, the locking operation can be manually initiated or controlled by computers to realize intelligence of the differential locking mechanism.

SUMMARY OF INVENTION

The present disclosure relates to a differential locking mechanism, including:

a differential mechanism; and a locking mechanism; the differential mechanism including a driven gear, a shell, two half shafts, two half-shaft gears and a planetary gear set; one end of the shell being fixedly provided with the driven gear, and each end of the shell being respectively provided with a corresponding half shaft in a rotating way; one end of each of the two half shafts, facing inside of the shell, being fixedly provided with a corresponding half-shaft gear; the planetary gear set being rotationally and symmetrically arranged around the two half-shaft gears; the planetary gear set comprising a planetary gear A, a planetary gear B and planetary gear shafts; the planetary gear shafts comprising a first planetary gear shaft and a second planetary gear shaft; the planetary gear A being meshed with the planetary gear B and one of the two half-shaft gears; the planetary gear B being meshed with another of the two half-shaft gears; the planetary gear A and the planetary gear B not being simultaneously meshed with a same half-shaft gear; the planetary gear set being rotationally arranged in the shell through the planetary gear shafts parallel to the half shafts; the planetary gear set being fixedly connected to the planetary gear shafts, and an end of the first planetary gear shaft, facing outside of the shell, being fixedly provided with a gear C; the locking mechanism comprising a sleeve, gears, a toothed sleeve, a shifting fork and a fixing piece; an end of the shell close to the gear C being fixedly provided with the sleeve; the sleeve being sleeved on one of the two half shafts; and the sleeve and the half shaft being rotationally connected; the gears comprising the gear C, a gear D, and a gear E; a side of the sleeve close to the half-shaft gears being sleeved with the gear D; one end of the gear D being fixedly provided with the gear E; the sleeve being rotationally connected with the gear D and the gear E; the gear D being meshed with the gear C; and a side of the sleeve away from the half-shaft gears being provided with a longitudinal tooth groove; the toothed sleeve being sleeved on the sleeve; inner teeth of the toothed sleeve being meshed with the longitudinal tooth groove; the toothed sleeve being synchronously rotated with the sleeve; the toothed sleeve being capable of longitudinally moving along the sleeve; and one toothed end of the toothed sleeve being faced to the gear E and capable of meshing with the gear E; an annular groove being provided on outside of the toothed sleeve; and the shifting fork being arranged in the annular groove of the toothed sleeve; the shifting fork and the toothed sleeve being movably connected; the fixing piece being arranged between the gear E and the toothed sleeve, and the fixing piece being fixedly connected with the sleeve.

Beneficial Effects

The differential locking mechanism is simple in overall structure, convenient to operate and use, good in stability and high in reliability. The differential locking mechanism is relatively simple in structure and durable, with low requirements on technology and material, easy to fabricate and assembly. The present disclosure further has the advantages of simple locking operation with sensitive reaction which can be locked without stopping or reducing the speed of the vehicle, manually started, and controlled by computers to realize intelligence of the differential locking mechanism.

1, driven gear; 2, shell; 3, planetary gear A; 4, planetary gear B; 5, first planetary gear shaft; 6, gear C; 7, gear D; 8, shift fork; 9, sleeve; 10, half shaft; 11, toothed sleeve; 12, fixing piece; 13, gear E; 14, half-shaft gear; 15, second planetary gear shaft; 16, internal gear D.

DESCRIPTION OF EMBODIMENTS

To make the aim, purpose and advantage more understandable, a further description to the present disclosure will be laid out hereinafter.

First Embodiment

Figure 2:
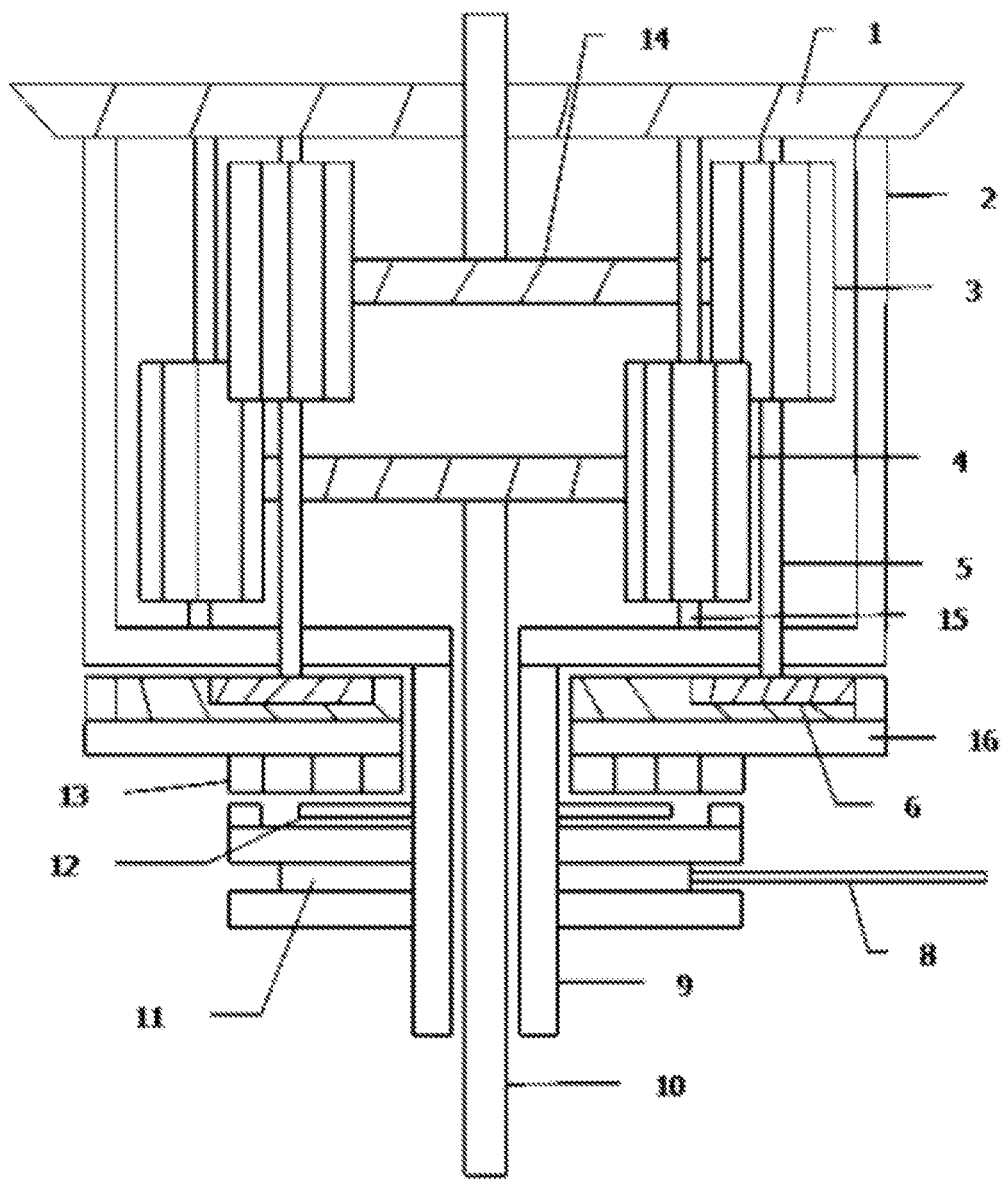
FIG. 2 is a schematic diagram of a differential locking mechanism according to the embodiment two of the present invention.

With reference to FIG. 2, the description taken in conjunction with the embodiments is as follows: a differential locking mechanism includes a differential mechanism and a locking mechanism. The differential mechanism includes a driven gear 1, a shell 2, two half shafts 10, two half-shaft gears 14 and a planetary gear A3, a planetary gear B4, a first planetary gear shaft 5 and a second planetary gear shaft 15; one end of the shell 2 is fixedly provided with the driven gear 1, and each end of the shell 2 is respectively provided with a corresponding half shaft 10 in a rotating way; one end of each of the two half shafts 10, facing inside of the shell 2, is fixedly provided with a corresponding half-shaft gear 14; the planetary gear A3 and the planetary gear B4 are rotationally and symmetrically arranged around the two half-shaft gears 14; the planetary gear B4 is rotationally arranged in the shell 2 through the second planetary gear shaft 15; the second planetary gear shaft 15 is parallel to the half shafts 10; the planetary gear A3 is rotationally arranged in the shell 2 through the first planetary gear shaft 5; the planetary gear A3 is fixedly connected to the first planetary gear shaft 5; the first planetary gear shaft 5 is parallel to the half shafts 10; and an end of the first planetary gear shaft 5, facing outside of the shell 2, is fixedly provided with a gear C6; the planetary gear A3 is meshed with the planetary gear B4 and one of the two half-shaft gears 14; the planetary gear B4 is meshed with another of the two half-shaft gears 14; the planetary gear A3 and the planetary gear B4 do not simultaneously mesh with a same half-shaft gear 14. The above is the basic structure of the existing differential mechanism.

The locking mechanism includes a sleeve 9, a gear C6, an internal gear D16, a gear E13, a toothed sleeve 11, a shifting fork 8 and a fixing piece 12; an end of the shell 2 close to the gear C6 is fixedly provided with the sleeve 9; the sleeve 9 is sleeved on one of the two half shafts 10; and the sleeve 9 and the half shaft 10 is rotationally connected; a side of the sleeve 9 close to the half-shaft gears 14 is sleeved with the internal gear D16; one end of the internal gear D16 is fixedly provided with the gear E13; the sleeve 9 is rotationally connected with the internal gear D16 and the gear E13; the internal gear D16 is meshed with the gear C6; and a side of the sleeve 9 away from the half-shaft gears 14 is provided with a longitudinal tooth groove; the toothed sleeve 11 is sleeved on the sleeve 9; inner teeth of the toothed sleeve 11 is meshed with the longitudinal tooth groove of the sleeve 9; the toothed sleeve 11 is synchronously rotated with the sleeve 9; the toothed sleeve 11 is capable of longitudinally moving along the sleeve 9; and one toothed end of the toothed sleeve 11 faces to the gear E13 and is capable of meshing with the gear E13; an annular groove is provided on an outside of the toothed sleeve 11; and the shifting fork 8 is arranged in the annular groove of the toothed sleeve 11; the shifting fork 8 and the toothed sleeve 11 are movably connected; the fixing piece 12 is arranged between the gear E13 and the toothed sleeve 11, and the fixing piece 12 is fixedly connected with the sleeve 9.

When the vehicle runs normally, the toothed sleeve 11 and the gear E13 are in a non-meshed state. The two half-shaft gears 14 rotate synchronously without rotating speed difference, and the planetary gears 3 and B4 that are meshed with the two half-shaft gears 14 do not rotate relatively. In this case, the gear C6 fixedly connected to the planetary gear A3 via first planetary gear shaft 5 does not rotate with respect to the shell 2. The internal gear D16 meshed with the gear C6 rotates synchronously relative to the sleeve 9, the gear E13 fixedly connected with the internal gear D16 also rotates synchronously with the sleeve 9. Because the toothed sleeve 11 rotates synchronously with the sleeve 9, the gear E13 and the toothed sleeve 11 rotate synchronously without rotating speed difference.

When a wheel on one side slips, the two half-shaft gears 14 generate rotating speed difference and drive the planetary gears A3 and B4 to generate relative rotation. Meanwhile, the planetary gear A3 drives the gear C6 to rotate through first planetary gear shaft 5. The gear C6 drives the internal gear D16 to rotate, the gear E13 fixedly connected with the internal gear D16 also generates rotation, and the gear E13 and toothed sleeve 11 generate rotating speed difference. At this time, the shifting fork 8 is started to drive the toothed sleeve 11 to move longitudinally to the gear E13 so that the toothed sleeve 11 is meshed with the gear E13 to complete locking process. The gear E13 and the toothed sleeve 11 can not generate rotating speed difference, the internal gear D16 and the gear C6 also can not generate relative rotation, the planetary gears A3 and B4 also can not generate relative rotation, the two half shaft gears 14 can not generate rotating speed difference, and the two half shafts 10 can only synchronously rotate.

Second Embodiment

Figure 1:
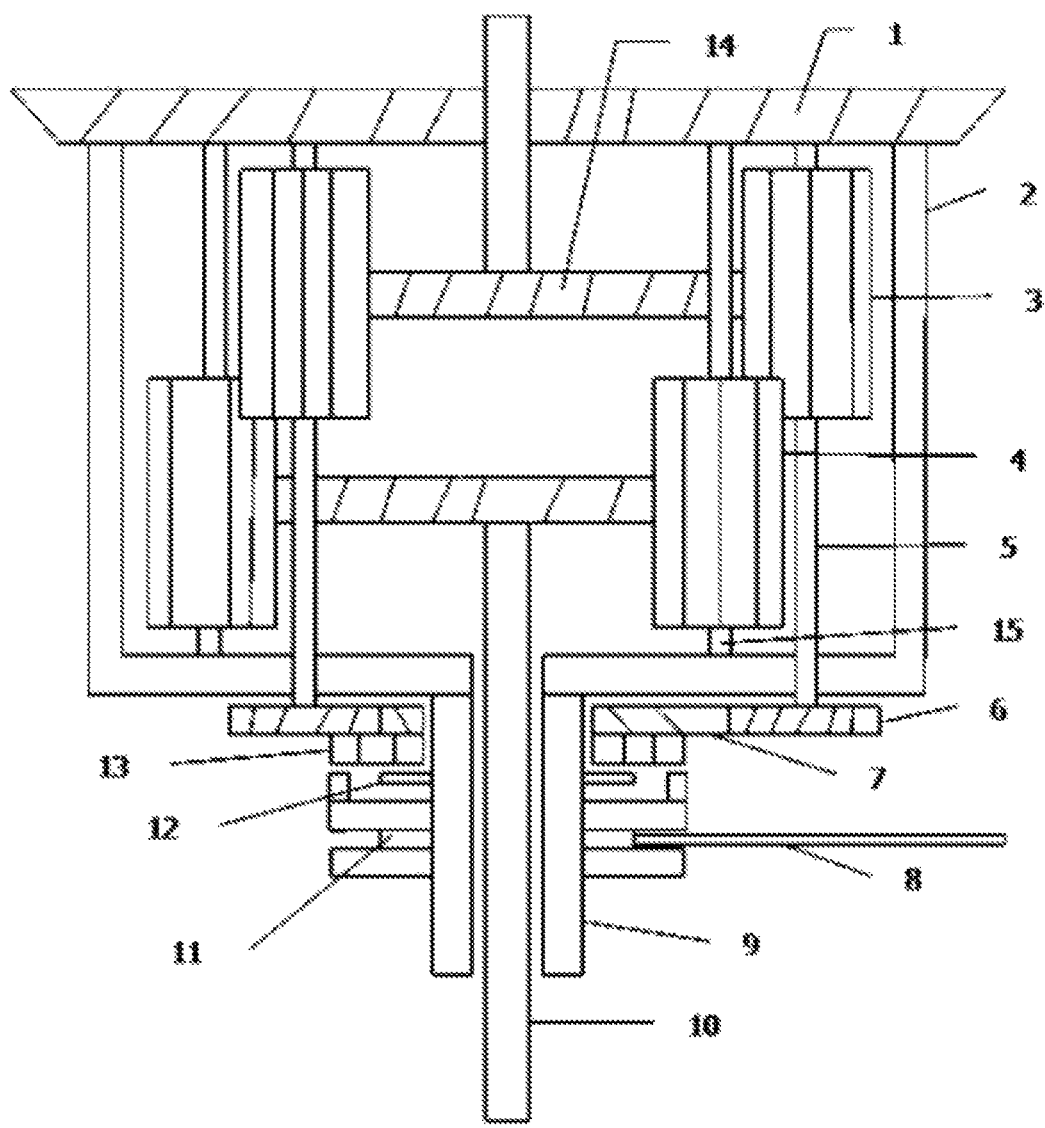
FIG. 1 is a schematic diagram of a differential locking mechanism according to the embodiment one of the present invention.

Referring now to FIG. 1, the description taken in conjunction with the examples is as follows: a differential locking mechanism includes a differential mechanism and a locking mechanism. The differential mechanism includes a driven gear 1, a shell 2, two half shafts 10, two half-shaft gears 14 and a planetary gear A3, a planetary gear B4, a first planetary gear shaft 5 and a second planetary gear shaft 15; one end of the shell 2 is fixedly provided with the driven gear 1, and each end of the shell 2 is respectively provided with a corresponding half shaft 10 in a rotating way; one end of each of the two half shafts 10, facing inside of the shell 2, is fixedly provided with a corresponding half-shaft gear 14; the planetary gear A3 and the planetary gear B4 are rotationally and symmetrically arranged around the two half-shaft gears 14; the planetary gear B4 is rotationally arranged in the shell 2 through the second planetary gear shaft 15; the second planetary gear shaft 15 is parallel to the half shafts 10; the planetary gear A3 is rotationally arranged in the shell 2 through the first planetary gear shaft 5; the planetary gear A3 is fixedly connected to the first planetary gear shaft 5; the first planetary gear shaft 5 is parallel to the half shafts 10; and an end of the first planetary gear shaft 5, facing outside of the shell 2, is fixedly provided with a gear C6; the planetary gear A3 is meshed with the planetary gear B4 and one of the two half-shaft gears 14; the planetary gear B4 is meshed with another of the two half-shaft gears 14; the planetary gear A3 and the planetary gear B4 do not simultaneously mesh with a same half-shaft gear 14. The above is the basic structure of the existing differential mechanism.

The locking mechanism comprises a sleeve 9, a gear C6, a gear D7, a gear E13, a toothed sleeve 11, a shifting fork 8 and a fixing piece 12; an end of the shell 2 close to the gear C6 is fixedly provided with the sleeve 9; the sleeve 9 is sleeved on one of the two half shafts 10; and the sleeve 9 and the half shaft 10 is rotationally connected; a side of the sleeve 9 close to the half-shaft gears 14 is sleeved with the gear D7; one end of the gear D7 is fixedly provided with the gear E13; the sleeve 9 is rotationally connected with the gear D7 and the gear E13; the gear D7 is meshed with the gear C6; and a side of the sleeve 9 away from the half-shaft gears 14 is provided with a longitudinal tooth groove; the toothed sleeve 11 is sleeved on the sleeve 9; inner teeth of the toothed sleeve 11 is meshed with the longitudinal tooth groove of the sleeve 9; the toothed sleeve 11 is synchronously rotated with the sleeve 9; the toothed sleeve 11 is capable of longitudinally moving along the sleeve 9; and one toothed end of the toothed sleeve 11 faces to the gear E13 and is capable of meshing with the gear E13; an annular groove is provided on an outside of the toothed sleeve 11; and the shifting fork 8 is arranged in the annular groove of the toothed sleeve 11; the shifting fork 8 and the toothed sleeve 11 are movably connected; the fixing piece 12 is arranged between the gear E13 and the toothed sleeve 11, and the fixing piece 12 is fixedly connected with the sleeve 9.

When the vehicle runs normally, the toothed sleeve 11 and the gear E13 are in a non-meshed state. The two half-shaft gears 14 rotate synchronously without rotating speed difference, and the planetary gears A3 and B4 that are meshed with the two half-shaft gears 14 do not rotate relatively. In this case, the gear C6 fixedly connected to the planetary gear A3 via first planetary gear shaft 5 does not rotate with respect to the shell 2. The gear D7 meshed with the gear C6 rotates synchronously relative to the sleeve 9, the gear E13 fixedly connected with the gear D7 also rotates synchronously with the sleeve 9. Because the toothed sleeve 11 rotates synchronously with the sleeve 9, the gear E13 and the toothed sleeve 11 rotate synchronously without rotating speed difference.

When a wheel on one side slips, the two half-shaft gears 14 generate rotating speed difference and drive the planetary gears A3 and B4 to generate relative rotation. Meanwhile, the planetary gear A3 drives the gear C6 to rotate through first planetary gear shaft 5. The gear C6 drives the gear D7 to rotate, the gear E13 fixedly connected with the gear D7 also generates rotation, and the gear E13 and toothed sleeve 11 generate rotating speed difference. At this time, the shifting fork 8 is started to drive the toothed sleeve 11 to move longitudinally to the gear E13 so that the toothed sleeve 11 is meshed with the gear E13 to complete locking process. The gear E13 and the toothed sleeve 11 can not generate rotating speed difference, the gear D7 and the gear C6 also can not generate relative rotation, the planetary gears A3 and B4 also can not generate relative rotation, the two half shaft gears 14 can not generate rotating speed difference, and the two half shafts 10 can only synchronously rotate.

INDUSTRIAL PRACTICABILITY

The differential locking mechanism of the present disclosure is simple in integral structure, convenient to operate and use, good in stability and high in reliability. The differential locking mechanism is relatively simple in structure and durable, have low requirements on technologies and materials, and easy to manufacture and assemble. The locking operation is simple and has sensitive reaction, without stopping the vehicle or slow the vehicle speed the locking operation may be realized. Also, the locking operation can be manually started, or can be controlled by the computer, to realize intelligence of the locking operation.

What is claimed is:

1. A differential locking mechanism, comprising:
a differential mechanism; and
a locking mechanism;
the differential mechanism comprising a driven gear, a shell, two half shafts, two half-shaft gears and a planetary gear set; one end of the shell being fixedly provided with the driven gear, and each end of the shell being respectively provided with a corresponding half shaft in a rotating way; one end of each of the two half shafts, facing inside of the shell, being fixedly provided with a corresponding half-shaft gear; the planetary gear set being rotationally and symmetrically arranged around the two half-shaft gears; the planetary gear set comprising a planetary gear A, a planetary gear B and planetary gear shafts; the planetary gear shafts comprising a first planetary gear shaft and a second planetary gear shaft; the planetary gear A being meshed with the planetary gear B and one of the two half-shaft gears; the planetary gear B being meshed with another of the two half-shaft gears; the planetary gear A and the planetary gear B not being simultaneously meshed with a same half-shaft gear; the planetary gear set being rotationally arranged in the shell through the planetary gear shafts parallel to the half shafts; the planetary gear set being fixedly connected to the planetary gear shafts, and an end of the first planetary gear shaft, facing outside of the shell, being fixedly provided with a gear C;

the locking mechanism comprising a sleeve, gears, a toothed sleeve, a shifting fork and a fixing piece; the other end of the shell close to the gear C being fixedly provided with the sleeve; the sleeve being sleeved on one of the two half shafts; and the sleeve and the one half shaft being rotationally connected; the gears comprising the gear C, a gear D, and a gear E; a side of the sleeve close to the half-shaft gears being sleeved with the gear D; one end of the gear D being fixedly provided with the gear E; the sleeve being rotationally connected with the gear D and the gear E; the gear D being meshed with the gear C; and a side of the sleeve away from the half-shaft gears being provided with a longitudinal tooth groove; the toothed sleeve being sleeved on the sleeve; inner teeth of the toothed sleeve being meshed with the longitudinal tooth groove; the toothed sleeve being synchronously rotated with the sleeve; the toothed sleeve being capable of longitudinally moving along the sleeve; and one toothed end of the toothed sleeve being faced to the gear E and capable of meshing with the gear E; an annular groove being provided on an outside of the toothed sleeve; and the shifting fork being arranged in the annular groove of the toothed sleeve; the shifting fork and the toothed sleeve being movably connected; the fixing piece being arranged between the gear E and the toothed sleeve, and the fixing piece being fixedly connected with the sleeve.

2. The differential locking mechanism of claim 1, wherein the gear D of the locking mechanism is an internal gear D; the internal gear D is arranged on the side of the sleeve close to the half-shaft gears; the sleeve is rotatably connected with the internal gear D and the gear E, and the internal gear D meshes with the gear C.

3. The differential locking mechanism of claim 1, wherein a rotational speed difference between the gear E and the sleeve is adjustable by adjusting a teeth number of the half-shaft gears, the planetary gear A, the planetary gear B, the gear C, and the gear D so as to facilitate the meshing of the gear E and the sleeve.

4. The differential locking mechanism of claim 1, wherein triggering a locking process is realized by a diversity of an electromagnetic, pneumatic or inclined surface;
an actuation is realized by manual or intelligent control.

* * * * *